United States Patent
Codella et al.

(10) Patent No.: US 9,311,703 B2
(45) Date of Patent: Apr. 12, 2016

(54) METHOD AND SYSTEM FOR CATEGORIZING HEART DISEASE STATES

(71) Applicant: International Business Machines Corporation, Armonk, NY (US)

(72) Inventors: Noel C. Codella, New York, NY (US); Jonathan H. Connell, II, Cortlandt-Manor, NY (US); John R. Smith, New York, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/266,661

(22) Filed: Apr. 30, 2014

(65) Prior Publication Data

US 2015/0317789 A1  Nov. 5, 2015

(51) Int. Cl.
*G06T 7/00* (2006.01)
*G06K 9/46* (2006.01)

(52) U.S. Cl.
CPC .............. *G06T 7/0012* (2013.01); *G06K 9/46* (2013.01); *G06K 9/468* (2013.01); *G06T 7/0081* (2013.01); *G06K 2009/4666* (2013.01); *G06T 2207/30048* (2013.01)

(58) Field of Classification Search
None
See application file for complete search history.

(56) References Cited

U.S. PATENT DOCUMENTS

| | | | | |
|---|---|---|---|---|
| 7,536,044 B2* | 5/2009 | Zhou | ..................... | G06K 9/6206 382/128 |
| 7,613,343 B2 | 11/2009 | David | | |
| 7,693,315 B2* | 4/2010 | Krishnan | ............... | G06T 7/0012 382/100 |
| 8,369,590 B2* | 2/2013 | Wang | ..................... | G06T 7/0081 382/128 |
| 2011/0243401 A1* | 10/2011 | Zabair | ..................... | G06K 9/00 382/128 |
| 2012/0310074 A1 | 12/2012 | Yamamori et al. | | |
| 2013/0011033 A1 | 1/2013 | Beymer et al. | | |
| 2013/0279764 A1* | 10/2013 | Codella | .................. | A61B 5/055 382/115 |

OTHER PUBLICATIONS

K Kawaji, NCF Codella, MR Prince, et al. "Automated Segmentation of Routine Clinical Cardiac Magnetic Resonance Imaging for Assessment of Left Ventricular Diastolic Dysfunction," Circ Cardiovasc Imaging. Nov. 2009;2(6):476-84. doi: 10.1161/CIRCIMAGING.109.879304. Epub Sep. 21, 2009.*

H-Y Lee, NCF Codella, MD Cham, et al. "Automatic Left Ventricle Segmentation Using Iterative Thresholding and an Active Contour Model With Adaptation on Short-Axis Cardiac MRI," IEEE Transactions on Biomedical Engineering, vol. 57, No. 4, Apr. 2010.*

* cited by examiner

*Primary Examiner* — Matthew Bella
*Assistant Examiner* — Soo Shin
(74) *Attorney, Agent, or Firm* — Ido Tuchman; Nidhi G. Kissoon

(57) ABSTRACT

A method, system and computer program for categorizing heart diseases is presented. An example method includes receiving a series of cardiac images of a heart, the cardiac images including a myocardium, and interior fibrous muscles of the heart. Cardiac images are segmented, into a myocardium segmentation showing an anatomical shape and a motion of the myocardium, and an interior fibrous muscles segmentation showing an anatomical shape and a motion of the interior fibrous muscles. The myocardium segmentation is converted into a regional characterization of the anatomical shape and motion of the myocardium. The interior fibrous muscles segmentation is converted to a regional characterization of the anatomical shape and motion of the interior fibrous muscles. Heart conditions are characterized based on the regional characterizations of the anatomical shape and the motion of the myocardium and the interior fibrous muscles.

20 Claims, 7 Drawing Sheets

METHOD AND SYSTEM FOR CATEGORIZING HEART DISEASE STATES

BACKGROUND

This invention relates to categorizing heart disease, and more particularly to a method, and system for categorizing heart disease states according to anatomical shape and motion of the heart.

Cardiac disease categorization is a complex task, partly due to the fact that many disease states have terms that indicate where in the heart they occur. For example, "antereoseptal hypokinesis" is a diseased state where the myocardium is hypokinetic near the part of the septum, closest to the patient's chest. In order to categorize this information, highly detailed analytics may be performed with anatomy-location-aware information. Such information can be produced by direct comparisons between anatomical segmentations.

Known cardiac disease categorization methods based on statistical segmentation models can be problematic because of the need for training data for every single diseased, state to be segmented. Other methods extract segmentation-free feature descriptors, but these methods often do not provide a complete description of the anatomy and have trouble with anatomy-location disease categorization.

BRIEF SUMMARY

Accordingly, one example of the present invention is a method for categorizing human heart disease states. The method includes receiving a series of cardiac images of a heart. The cardiac images include a myocardium and interior fibrous muscles of the heart. A segmenting step segments the cardiac images into a myocardium segmentation showing an anatomical shape and a motion of the myocardium. The method further includes converting the myocardium segmentation to a regional characterization of the anatomical shape and motion of the myocardium. The method further includes segmenting the cardiac images into an interior fibrous muscles segmentation showing an anatomical shape and a motion of the interior fibrous muscles. A converting step converts the interior fibrous muscles segmentation to a regional characterization of the anatomical shape and motion of the interior fibrous muscles. Additionally, the method includes classifying one or more heart conditions based on the regional characterizations of the anatomical shape and the motion of the myocardium and the interior fibrous muscles.

Yet another example of the present invention is a system for categorizing human heart disease states. The system includes a system memory and a computer processor coupled to the system memory. The system further includes a receiving unit coupled to the computer processor. The receiving unit receives a series of cardiac images of a heart, the cardiac images including a myocardium and interior fibrous muscles of the heart. A first segmenting unit segments the cardiac images into a myocardium segmentation showing an anatomical shape and a motion of the myocardium. A first converting unit converts the myocardium segmentation to a regional characterization of the anatomical shape and motion of the myocardium. A second segmenting unit segments the cardiac images into an interior fibrous muscles segmentation showing an anatomical shape and a motion of the interior fibrous muscles. A second converting unit converts the interior fibrous muscles segmentation to a regional characterization of the anatomical shape and motion of the interior fibrous muscles. The system further includes a classifying unit to classify one or mere heart conditions based on the regional characterizations of the anatomical shape and the motion of the myocardium and the interior fibrous muscles.

A further example embodiment of the present invention is a computer program product for categorizing human heart disease states. The computer program product includes computer readable program code configured to: receive a series of cardiac images of a heart, the cardiac images including a myocardium and interior fibrous muscles of the heart; segment the cardiac images into a myocardium segmentation showing an anatomical shape and a motion of the myocardium; convert the myocardium segmentation to a regional characterization of the anatomical shape and motion of the myocardium; segment the cardiac images into an interior fibrous muscles segmentation showing an anatomical shape and a motion of the interior fibrous muscles; convert the interior fibrous muscles segmentation to a regional characterization of the anatomical shape and motion of the interior fibrous muscles; and classify one or mere heart conditions based on the regional characterizations of the anatomical shape and the motion of the myocardium and the interior fibrous muscles.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
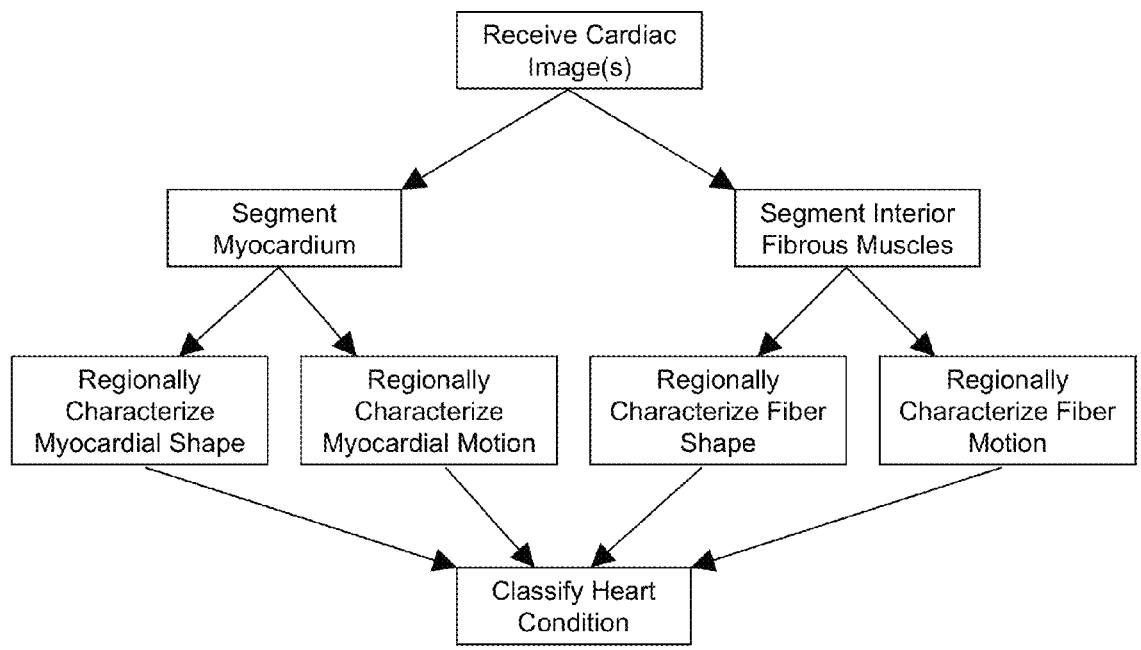
FIG. 1 shows a flowchart for categorizing heart disease states according to one embodiment of the present invention.

The present invention is described with reference to embodiments of the invention. Throughout the description of the invention reference is made to FIGS. 1-7. When referring to the figures, like structures and elements shown throughout are indicated with like reference numerals.

As discussed in detail below, embodiments of the present invention include a process to categorize human heart disease states. The process may categorize heart disease states by analyzing two components of the heart muscle: the outer myocardium and the interior fibrous muscles. The analysis may include characterizing both the anatomical shape and motion of the muscles. Moreover, the characterization may include using multiple values for each property, where each of the values is associated with a distinct spatial region. The actual categorization may be performed by a machine learning system trained with labeled examples of each disease state.

FIG. 1 shows a flowchart for categorizing heart disease states according to one embodiment of the present invention. Segmentations of relevant cardiac: structures may be performed on a cardiac medical image of an individual. This may include looking for the large muscle comprising the exterior of the heart, the myocardium (left branch), and also finding interior fibrous structures such as the papillary muscles (right branch).

Figure 2:
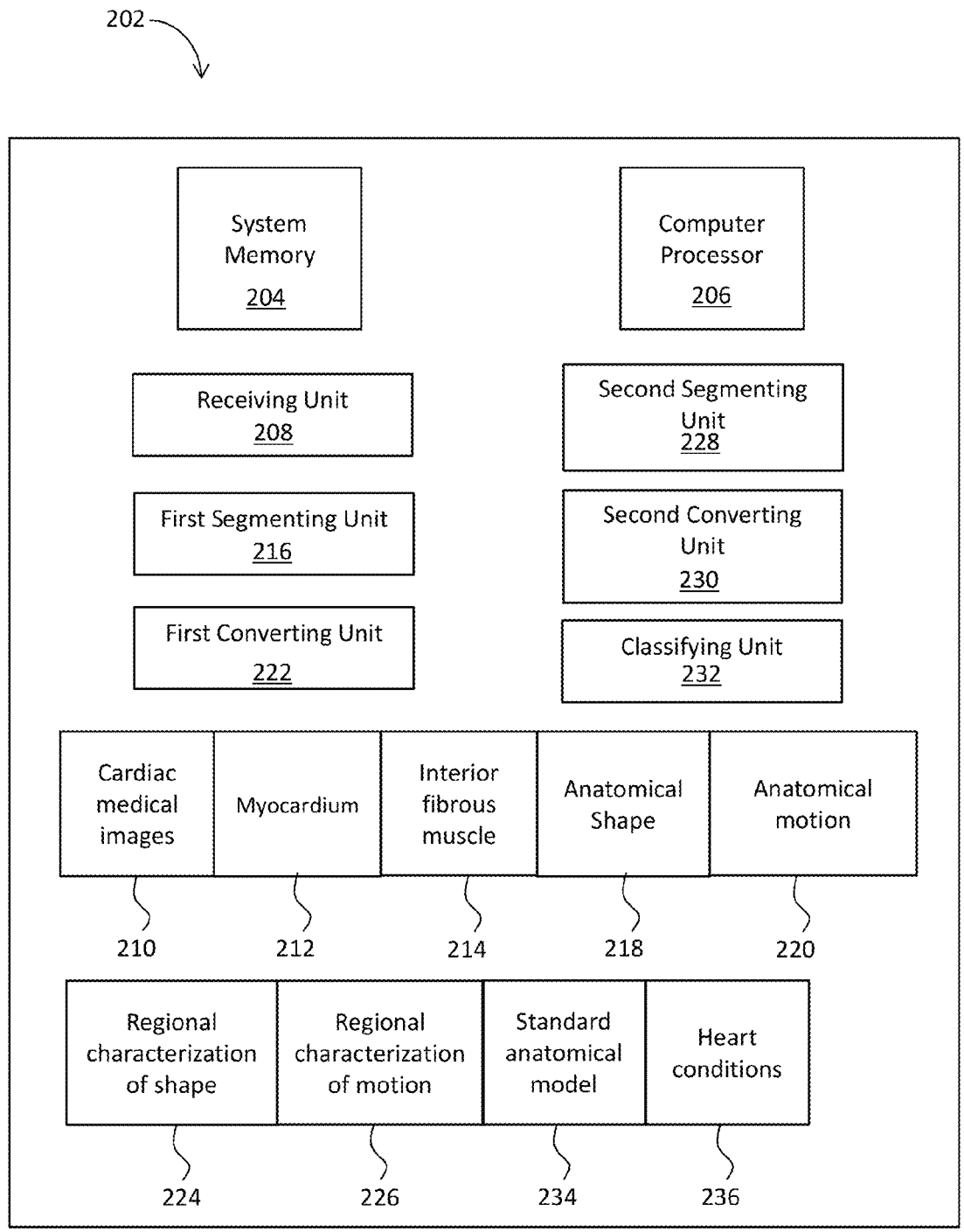
FIG. 2 shows a system, for classifying heart disease states in accordance with one embodiment of the present invention.

FIG. 2 snows a system 202 for classifying heart disease states according to one embodiment of the present invention. The system may include a system memory 204, a computer processor 206, a receiving unit 208, a first segmenting unit 216, a first converting unit 222, a second segmenting unit 228, a second converting unit 230, and a classifying unit 232.

The receiving unit 208 is coupled to the computer processor 206 and receives a series of cardiac images 210 of a heart. The cardiac images 210 may include a myocardium 212 and interior fibrous muscles 214 of the heart. In one embodiment, a series of cardiac images is captured at two or more time points.

The first segmenting unit 216 segments the cardiac images 210 into a myocardium segmentation showing an anatomical shape 218 and a motion 220 of the myocardium.

In one embodiment of the invention, segmenting the cardiac images 110 is performed using the LV METRIC (Left Ventricle Myocardial Effusion Threshold Reduction with Intravoxel Computation) algorithm and/or the LV-ITHACA (Left Ventricle Iterative Thresholding and Active Contour Model with Adaption) algorithm. These segmentation algorithms are well known to those skilled in the art.

A number of imaging modalities provide highly detailed images of cardiac structures which may be useful for this work. Among these techniques is Cine SSFP Cardiac MRI, and Cardiac CT. Cardiac MRI may be preferred because it does not expose the patient to ionizing radiation and does not require contrast injection.

A Cine SSFP Cardiac MRI dataset can include a 4D dataset of images with varying spatial slice position along the axis of the left ventricle, and varying temporal position, normalized to the cardiac cycle. In such a manner, the dataset provides both anatomical information (images) and motion information (images at different time points).

Figure 3:
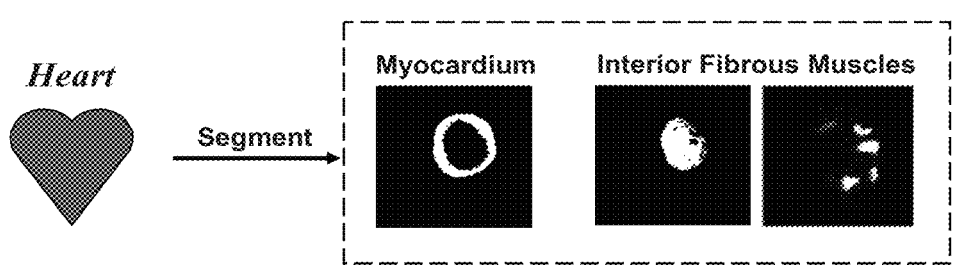
FIG. 3 shows segmentations of cardiac medical images according to one embodiment of the present invention.

FIG. 3 shows segmentations of cardiac medical images according to one embodiment of the present invention. The segmentations may be a result of a cardiac segmentation from a Cine SSFP Cardiac MRI image using algorithms such as LV-METRIC and LV-ITHACA. Both of these algorithms are so-called "soft-segmentation" methods that determine the partial content of blood and myocardium within each voxel. In this way, highly detailed information is relayed in regard to the complex structure of the heart.

LV-METRIC may perform segmentation in 5 steps: 1) using a Hough circle transform on the subtraction of diastolic and systolic image frames to find the center of the left ventricle; 2) performing edge-based region, growth to measure the mean and standard deviation signal intensity of blood; 3) fit a 2D plane to the signal intensities of blood using linear regression in order to compensate for variation in coil sensitivity; 4) perform an iterative intensity based region growth to estimate the mean signal of the myocardium; and 5) perform intensity based region growth based on estimate means and standard deviations of blood and myocardium.

LV-ITHACA takes the resultant LV-METRIC segmentation and may fit an active contour model to the edge and signal intensities of the epicardial surface in order to achieve a myocardial segmentation. Other methods and algorithms can also be used to explicitly extract papillary and trabecular shape information, such as those described in Codella et al., "Cardiac Anatomy as a Biometric", 19th IEEE International Conference on Image Processing (ICIP), pp. 1137-1140 (2012), incorporated herein by reference in its entirety.

The first converting unit 222 converts the myocardium segmentation to a regional characterization of the anatomical shape 224 and motion 226 of the myocardium.

The second, segmenting unit 228 segments the cardiac images 210 into an interior fibrous muscles segmentation showing an anatomical shape 218 and a motion 220 of the interior fibrous muscles.

The second converting unit 230 converts the interior fibrous muscles segmentation to a regional characterization of the anatomical shape 224 and motion 225 of the interior fibrous muscles.

Figure 4:
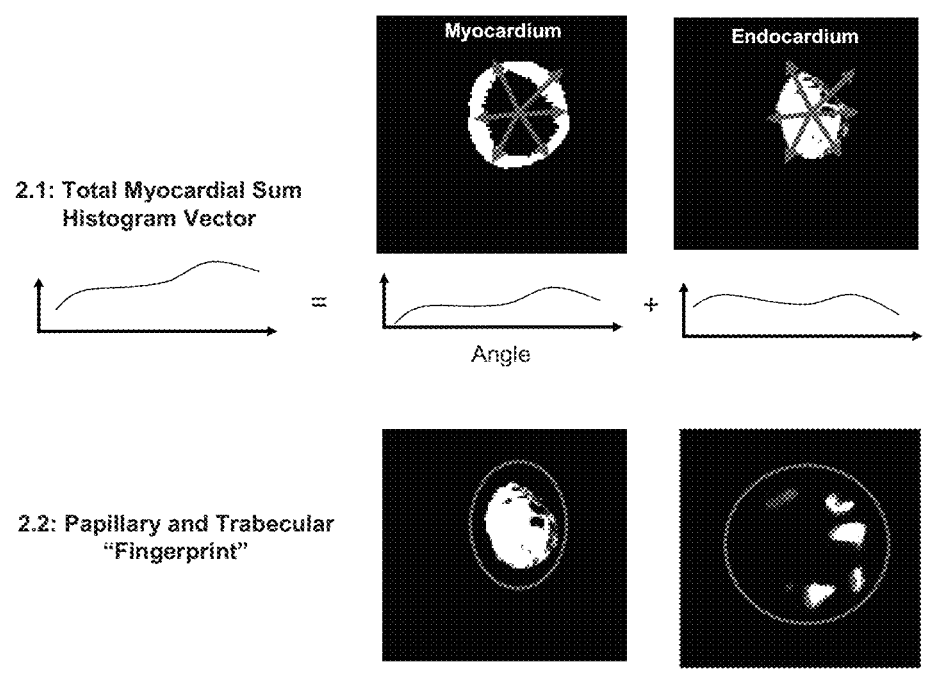
FIG. 4 shows regional characterizations of shape according to one embodiment of the present invention.

In another example embodiment of the present invention, the segmentations may be converted to some regional characterization of the anatomical shape of the segmentation. FIG. 4 shows regional characterizations of shape according to one embodiment of the present invention. As an example embodiment, this may involve the thickness measured along polar radii for a set of angles, or by using a canonical form ("fingerprint") of the segmentations. Generating a canonical form may include cropping the image to contain only the relevant information of the segmentation, and normalizing that segmentation to a standard reference angle and scale. Either result can then be compared by measuring the L2 norm between them, or using another kernelized distance metric.

Figure 5:
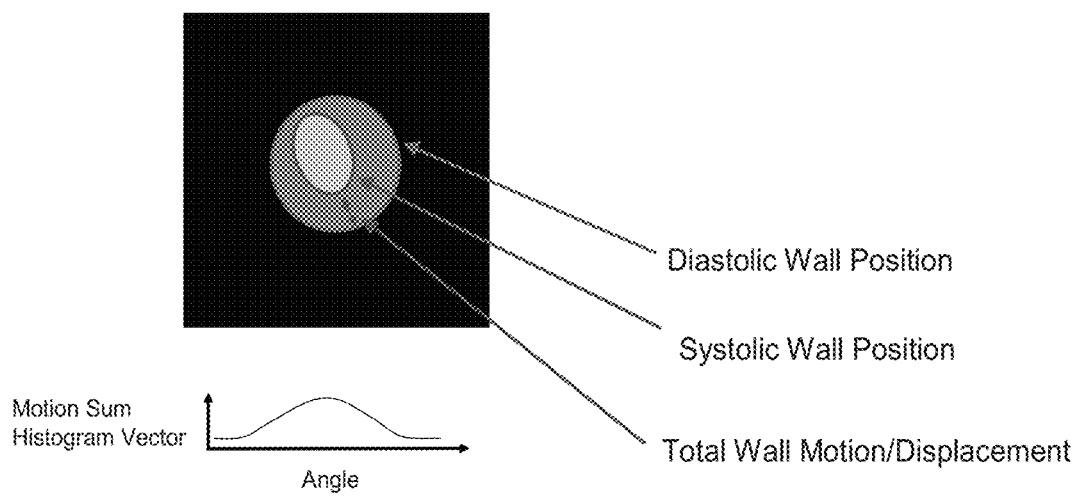
FIG. 5 shows regional characterizations of motion according to one embodiment of the present invention.

FIG. 5 shows regional characterizations of motion according to one embodiment of the present invention. Segmentations of images over multiple time points can be converted to regional characterizations of motion. One example embodiment involves one or more subtractions between two segmentations at different time points, and taking the measured span of the difference along polar radii for a set of angles.

The classifying unit 232 classifies one or more heart conditions based on the regional characterizations of the anatomical shape 224 and the motion 226 of the myocardium 212 and the interior fibrous muscles 214.

Figure 6:
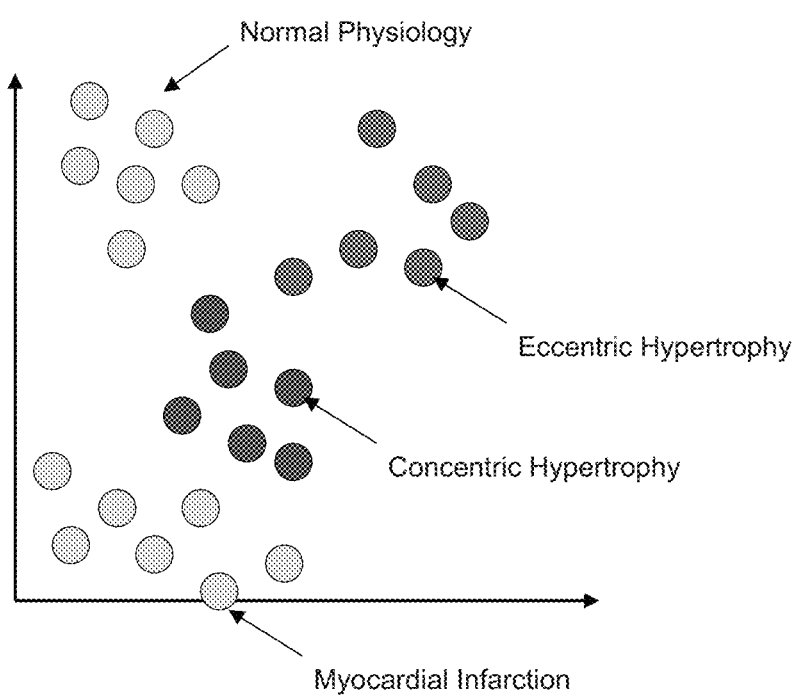
FIG. 6 shows multidimensional regional characterizations in accordance with one embodiment of the present invention.

FIG. 6 shows multidimensional regional characterizations in accordance with one embodiment of the present invention. The regional characterizations, along with labeling information about overall heart condition, may be used to classify disease or other clinically relevant states. That is, the regional characterizations may be used as feature vectors in a machine learning algorithm, such as Support Vector Machine (SVM), to allow supervised training to be performed. Supervised training often involves exemplars for both healthy and diseased states.

Examples of disease states that might be classified include, but not limited to, eccentric hypertrophy, concentric hypertrophy, and myocardial infarction. All of these diseases are known to affect both morphology, which is measured through shape, and function, which is measured through motion.

In one embodiment of the invention, the receiving unit 208 may further be comprised to receive a standard anatomical model 234 of a human heart. The standard anatomical model 234 may include standard orientation and a scale of the human heart. It is contemplated that the segmentation of the myocardium and of the fibrous muscles can be registered to a standard anatomical model 234 of a human heart prior to converting the segmentations to regional characterizations of anatomical shape and of motion. As used herein, "registering" to a standard anatomical model is the process of transforming the segmentation of the myocardium and of the fibrous muscles images into the coordinate system of the standard anatomical model. See, for example, en.wikipedia.org/wiki/Image_registration.

In one embodiment of the invention, the classifying unit 232 classifies the heart conditions based, on the regional characterizations of the anatomical shape 224 and the motion 226 of the myocardium 212, and the interior fibrous muscles 214 may be performed after geometric registration with the standard anatomical model 234 of the human heart. It is contemplated that the classifying unit may further compare regional images of the regional, characterization of motion of the myocardium and/or the regional characterization of motion of the interior fibrous muscles captured at two or more time points.

In one embodiment of the present invention, the regional characterization of the anatomical shape 224 of the myocardium may include a regional characterization of myocardial, thickness. In another example embodiment, the regional characterization of the anatomical shape 224 of the interior fibrous muscles may include a regional characterization of interior fibrous muscles thickness.

In one embodiment of the present invention, the regional characterization of the motion 226 of the myocardium may be based on Doppler imaging from a single image, and the regional characterization of the motion 226 of the interior fibrous muscles may be likewise based on Doppler imaging from a single image.

In one embodiment of the present invention, the regional characterization of the motion 226 of the myocardium may be based on optical flow across two or more images, and likewise the regional characterization of the motion 226 of the interior fibrous muscles may be based on optical flow of two or more images. In another embodiment, the comparison is based on subtraction of segmented regions.

In one embodiment of the present invention, the classifying unit 232 may include a support vector machine to classify the heart condition 236 based on labeling information and the regional characterizations of the anatomical shape 224 and the motion 226 of the myocardium 212 and the interior fibrous muscles 214. The labeling information may include information of each heart disease state.

In another embodiment of the present invention, the classifying unit 232 may include a statistical principal component analysis model of either healthy or diseased states. Classification is based on the probability of the example being derived from the model distribution.

Figure 7:
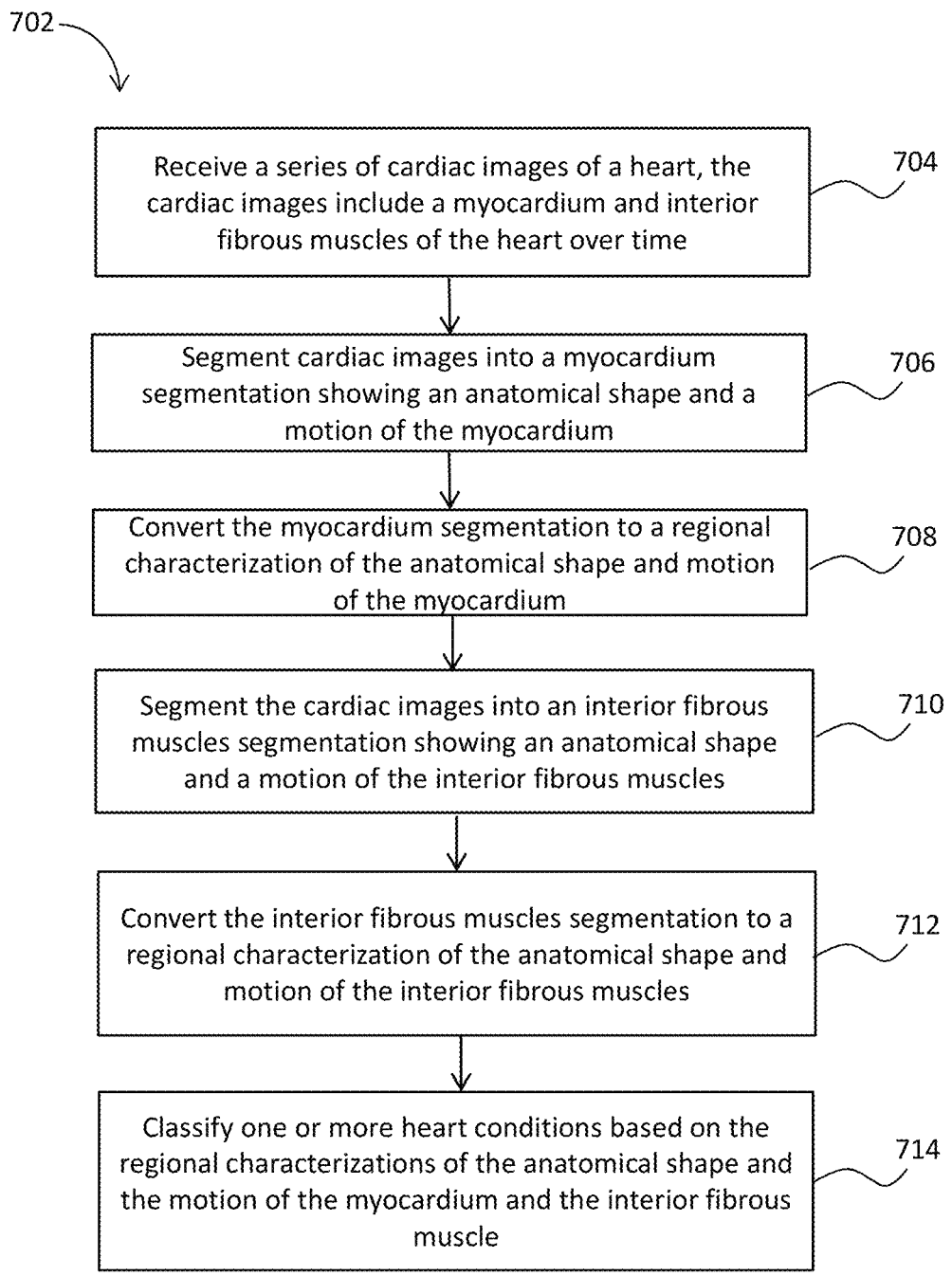
FIG. 7 shows a method for classifying heart disease states in accordance with one embodiment of the present invention.

FIG. 7 shows a method for classifying heart disease states 702 in accordance with one embodiment of the present invention. The method includes a receiving step 704. During the receiving step 704, a series of cardiac images of a heart may be received. The cardiac images may include a myocardium and interior fibrous muscles of the heart. After receiving step 704 is completed, the method continues to segmenting step 706.

At segmenting step 706, the cardiac images may be segmented into a myocardium segmentation showing an anatomical shape and a motion of the myocardium. After segmenting step 706 is completed, the method continues to converting step 708.

At converting step 708, the myocardium segmentation may be converted to a regional characterization of the anatomical shape and motion of the myocardium. In one embodiment, the segmentation of the myocardium and of the fibrous muscles are registered to a standard, anatomical model of a human heart prior to converting the segmentations to regional characterizations of anatomical shape and of motion, After converting step 708 is completed, the method continues to segmenting step 710.

At segmenting step 710, the cardiac images may be segmented into an interior fibrous muscles segmentation showing an anatomical shape and a motion of the interior fibrous muscles. After segmenting step 710 is completed, the method continues to converting step 712.

At converting step 712, the interior fibrous muscles segmentation may be converted to a regional characterization of the anatomical shape and motion of the interior fibrous muscles. After converting step 712 is completed, the method continues to classifying step 714.

In one embodiment, the regional characterization of the anatomical shape of the myocardium includes a regional characterization of myocardial thickness and the regional characterization of the anatomical shape of the interior fibrous muscles includes a regional characterization of interior fibrous muscles thickness.

At classifying step 714, one or more heart conditions may be classified based on the regional characterizations of the anatomical shape and the motion of the myocardium and the interior fibrous muscles.

In one embodiment, heart conditions may be classified using a support vector machine to classify the heart condition based on labeling information and the regional characterizations of the anatomical shape and the motion of the myocardium and the interior fibrous muscles, the labeling information including information of each heart disease state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program, for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program, for use by or in connection with an instruction execution system, apparatus, or device.

Program, code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written, in any combination of one or more programming languages, including an object oriented programming language such as C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided, to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention, have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of categorizing heart disease states, the method comprising:
   receiving a series of cardiac images of a heart, the cardiac images including images of a myocardium and interior fibrous muscles of the heart;
   segmenting the cardiac images into a myocardium segmentation showing an anatomical shape and a motion of the myocardium;
   converting the myocardium segmentation to a regional characterization of the anatomical shape and motion of the myocardium;
   segmenting the cardiac images into an interior fibrous muscles segmentation showing an anatomical shape and a motion of the interior fibrous muscles;
   converting the interior fibrous muscles segmentation to a regional characterization of the anatomical shape and motion of the interior fibrous muscles; and
   classifying one or more heart conditions based on the regional characterizations of the anatomical shape and of the motion of the myocardium and the interior fibrous muscles.

2. The method of claim 1, wherein a series of cardiac images is captured at two or more time points.

3. The method of claim 2, further comprising at least one of comparing the regional characterization of motion of the myocardium at two or more time points and comparing the regional characterization of motion of the interior fibrous muscles at two or more time points.

4. The method of claim 3, wherein comparing the regional images is based on optical flow.

5. The method of claim 3, wherein comparing the regional images is based on subtraction of segmentations.

6. The method of claim 1, wherein segmenting the cardiac images is performed using at least one of a LV METRIC (Left Ventricle Myocardial Effusion Threshold Reduction with Intravoxel Computation) algorithm and a LV-ITHACA (Left Ventricle Iterative Thresholding and Active Contour Model with Adaption) algorithm.

7. The method of claim 1, further comprising registering the segmentation of the myocardium and of the fibrous muscles to a standard anatomical model of a human heart prior to converting the segmentations to regional characterizations of anatomical shape and of motion.

8. The method of claim 1, further comprising:
   wherein the regional characterization of the anatomical shape of the myocardium includes a regional characterization of myocardial thickness; and wherein the regional characterization of the anatomical shape of the interior fibrous muscles includes a regional characterization of interior fibrous muscles thickness.

9. The method of claim 1, further comprising wherein at least one of the regional characterization of the motion of the myocardium and the regional characterization of the motion of the interior fibrous muscles is based on Doppler imaging.

10. The method of claim 1, wherein classifying the heart conditions includes using a support vector machine to classify the heart condition based on labeling information and the regional characterizations of the anatomical shape and the motion of the myocardium and the interior fibrous muscles, the labeling information including information of each heart disease state.

11. A system for categorizing human heart disease states, the system comprising:
a system memory;
a computer processor coupled to the system memory;
a receiving unit coupled to the computer processor, the receiving unit to receive a series of cardiac images of a heart, the cardiac images including images of a myocardium and interior fibrous muscles of the heart;
a first segmenting unit to segment the cardiac images into a myocardium segmentation showing an anatomical shape and a motion of the myocardium;
a first converting unit to convert the myocardium segmentation to a regional characterization of the anatomical shape and motion of the myocardium;
a second segmenting unit to segment the cardiac images into an interior fibrous muscles segmentation showing an anatomical shape and a motion of the interior fibrous muscles;
a second converting unit to convert the interior fibrous muscles segmentation to a regional characterization of the anatomical shape and motion of the interior fibrous muscles; and
a classifying unit to classify one or more heart conditions based on the regional characterizations of the anatomical shape and the motion of the myocardium and the interior fibrous muscles.

12. The system of claim 11, further comprising a receiving unit to receive a standard anatomical model of a human heart, the standard anatomical model including standard reference angles and a scale of the human heart.

13. The system of claim 12, wherein the classifying unit classifies the heart conditions based on the regional characterizations of the anatomical shape and the motion of the myocardium and the interior fibrous muscles is performed with respect to the standard anatomical model of the human heart.

14. The system of claim 11, further comprising:
wherein the regional characterization of the anatomical shape of the myocardium includes a regional characterization of myocardial thickness; and
wherein the regional characterization of the anatomical shape of the interior fibrous muscles includes a regional characterization of interior fibrous muscles thickness.

15. The system of claim 11, further comprising:
wherein at least one of the regional characterization of the motion of the myocardium is based on Doppler imaging; and
wherein at least one of the regional characterization of the motion of the interior fibrous muscles is based on Doppler imaging.

16. The system of claim 11, further comprising:
wherein at least one of the regional characterization of the motion of the myocardium is based on optical flow; and
wherein at least one of the regional characterization of the motion of the interior fibrous muscles is based on optical flow.

17. The system of claim 11, wherein the classifying unit includes a support vector machine to classify the heart condition based on labeling information and the regional characterizations of the anatomical shape and the motion of the myocardium and the interior fibrous muscles, the labeling information including information of each heart disease state.

18. A computer program product for categorizing human heart disease states, the computer program product comprising;
a non-transitory computer readable storage medium having computer readable program code embodied therewith, the computer readable program code configured to:
receive a series of cardiac images of a heart, the cardiac images including images of a myocardium and interior fibrous muscles of the heart;
segment the cardiac images into a myocardium segmentation showing an anatomical shape and a motion of the myocardium;
convert the myocardium segmentation to a regional characterization of the anatomical shape and motion of the myocardium;
segment the cardiac images into an interior fibrous muscles segmentation showing an anatomical shape and a motion of the interior fibrous muscles;
convert the interior fibrous muscles segmentation to a regional characterization of the anatomical shape and motion of the interior fibrous muscles; and
classify one or more heart conditions based on the regional characterizations of the anatomical shape and the motion of the myocardium and the interior fibrous muscles.

19. The computer program product of claim 18, further comprising computer readable code to receive a standard anatomical model of a human heart, the standard anatomical model including standard reference angles and a scale of the human heart.

20. The computer program product of claim 18, wherein the computer readable code to classify the heart conditions based on the regional characterizations of the anatomical shape and the motion of the myocardium and the interior fibrous muscles is performed with respect to the standard anatomical model of the human heart.

* * * * *